US010509992B2

(12) United States Patent
Bertiaux et al.

(10) Patent No.: US 10,509,992 B2
(45) Date of Patent: Dec. 17, 2019

(54) ELECTRONIC CARD COMPRISING A FINGERPRINT SENSOR AND A TACTILE MARK (71) Applicant: IDEMIA IDENTITY & SECURITY FRANCE, Issy-les-Moulineaux (FR)

(72) Inventors: Philippe Bertiaux, Issy les Moulineaux (FR); Sylvie Pompeani, Issy les Moulineaux (FR); Francois Germain, Issy les Moulineaux (FR)

(73) Assignee: IDEMIA IDENTITY & SECURITY FRANCE, Issy les Moulineaux (FR)

( * ) Notice: Subject to any disclaimer, the term of this patent is extended or adjusted under 35 U.S.C. 154(b) by 0 days.

(21) Appl. No.: 16/037,145

(22) Filed: Jul. 17, 2018

(65) Prior Publication Data
US 2019/0019072 A1 Jan. 17, 2019

(30) Foreign Application Priority Data

Jul. 17, 2017 (FR) ..................................... 17 56766

(51) Int. Cl.
*G06K 19/07* (2006.01)
*G06K 19/077* (2006.01)
(52) U.S. Cl.
CPC ... *G06K 19/0718* (2013.01); *G06K 19/07701* (2013.01); *G06K 19/07722* (2013.01); *G06K 19/07733* (2013.01)
(58) Field of Classification Search
None
See application file for complete search history.

(56) References Cited

U.S. PATENT DOCUMENTS

| 2003/0178495 | A1* | 9/2003 | Jones | ........................ B23C 5/10 235/492 |
| 2005/0139685 | A1 | 6/2005 | Kozlay | |
| 2009/0153297 | A1* | 6/2009 | Gardner | ............. G06K 9/00026 340/5.83 |
| 2015/0242696 | A1* | 8/2015 | Kim | ........................ G06F 3/0416 345/173 |
| 2016/0140379 | A1 | 5/2016 | Pedersen | |

FOREIGN PATENT DOCUMENTS

| DE | 199 21 231 A1 | 11/2000 | |
| DE | 19921231 A1 * | 11/2000 | ......... G06K 9/00053 |
| WO | 2014/053717 A1 | 4/2014 | |

OTHER PUBLICATIONS

Communication dated May 18, 2018 from the French Patent Office in counterpart Application No. 1756766.

\* cited by examiner

*Primary Examiner* — Kristy A Haupt
(74) *Attorney, Agent, or Firm* — Sughrue Mion, PLLC (57) ABSTRACT

The invention relates to an electronic card comprising
a card body (1) comprising an upper surface (11) and a lower surface (12);
a fingerprint sensor (2) flush with the upper surface of said card body;
a tactile mark (3) placed on the upper surface of the card body near the fingerprint sensor, said tactile mark having an excess thickness from the upper surface of the card to guide, when said mark is touched, a correct positioning of a finger on said fingerprint sensor, the thickness of the tactile mark being such that the card has a thickness compatible with standard ISO 781 ID1, the thickness of the tactile mark preferably being between 30 and 60 µm, typically 50 µm.

10 Claims, 8 Drawing Sheets

ELECTRONIC CARD COMPRISING A FINGERPRINT SENSOR AND A TACTILE MARK

GENERAL TECHNICAL FIELD

The invention relates to the field of electronic cards and the manufacture of such cards. And the invention relates more particularly to electronic cards comprising a fingerprint sensor in the format specified in standard ISO 781 ID1.

PRIOR ART

On electronic cards, comprising a fingerprint sensor, in the "smart card" format specified in standards ISO 781 ID1 and 7816, users tend to position their finger on the edge of the sensor instead of centring the finger with the sensor.

There is also a problem with positioning of the finger on the fingerprint sensor given the small surface available on a card of "smart card" type.

For correct positioning of the finger, conventionally, a visual mark is added to the card so that the user knows where to place his (her) finger.

But a simple visual mark is not enough. In fact, it was noticed that users still had trouble aligning their finger with the sensor.

Moreover, users with long nails were also unable to properly distinguish the visual limit with which they had to align the tip of the skin of the finger.

DESCRIPTION OF THE INVENTION

The invention eliminates the above disadvantages.

For this purpose, the invention proposes an electronic card comprising
 a card body comprising an upper surface and a lower surface;
 a fingerprint sensor flush with the upper surface of said card body;
a tactile mark placed on the upper surface of the card body near the fingerprint sensor, said tactile mark having an excess thickness from the upper surface of the card to guide, when said mark is touched, a correct positioning of a finger on said fingerprint sensor, the thickness of the tactile mark being such that the card has a thickness compatible with standard ISO 781 ID1, the thickness of the tactile mark preferably being between 30 and 60 µm, typically 50 µm.

The invention is advantageously completed by the following characteristics, taken alone or in any one of their technically possible combinations.

The tactile mark is defined by two arcs of a circle in each other jointed at their ends by line segments.

The tactile mark is in the form of a crescent moon.

The tactile mark is defined by a semi-circle adjoining the fingerprint sensor.

The tactile mark is defined by a U encompassing the fingerprint sensor.

The tactile mark is defined by the image of a fingerprint placed around the fingerprint sensor.

The card also comprises an alignment mark visible to the naked eye defining a position of the fingertip of the user on the upper surface of the card body, the alignment mark being typically an arc of a circle open to the fingerprint sensor.

The card body having been obtained by lamination of several layers together, the tactile mark being obtained by printing of a varnish on the upper surface of the card body, by means of a screen printing process followed by a curing step of the card body and the tactile mark.

The card body having been obtained by lamination of several layers together, the tactile mark being added by etching, by means of a laser, of the upper surface of the card body.

The tactile mark is obtained simultaneously with the card body by lamination of several layers together, lamination plates being etched with the pattern defining the tactile mark.

Having a mark in relief on the card body guides the user. In this way, intuitively he will be able to correctly position his finger.

According to the positions of the mark, this can be a stop to indicate the start or end of the fingerprint sensor from the edge of the card body.

DESCRIPTION OF THE FIGURES

Other characteristics, aims and advantages of the invention will emerge from the following description which is purely illustrative and non-limiting, and which must be considered with respect to the appended drawings, in which.

In all figures, similar elements are designated by identical reference numerals.

DETAILED DESCRIPTION OF THE INVENTION

The figures illustrate an electronic card comprising a card body 1 and a fingerprint sensor 2.

The card body 1 comprises an upper surface 11 and a lower surface 12 and has dimensions complying with standard ISO 781 ID1. In particular, the card body 1 has a thickness between 780 and 840 µm.

The card body 1 comprises several layers joined together by means of a hot lamination process in order to satisfy the restrictions of the layers holding together of standard ISO 781 ID1.

The fingerprint sensor 2 is flush with the upper surface 11 of the card body 1 and is configured to acquire the image of a fingerprint of a user and to verify the identity of the owner of the electronic card. The upper surface 11 of the card body is made of plastic material.

The fingerprint sensor 2 comprises a semi-conductive substrate 22 which can be flexible or rigid. In all cases it is ensured that it is integrated into a card body according to the restrictions of standard ISO 781 ID1.

The fingerprint sensor 2 is rectangular and has a first edge 211 and a second edge 212 viewed in the direction of positioning of the finger (arrow in FIG. 1), these edges are viewed over widths of the fingerprint sensor 2.

A part of this substrate 22 constitutes the active part 21 of the fingerprint sensor 2 on which the owner will place his finger so that the image of his fingerprint is acquired.

The remainder of the substrate 22 enables assembly of the fingerprint sensor 2 on the card.

The substrate 22 of the fingerprint sensor 2 can be flexible or rigid.

Advantageously, the card includes a tactile mark 3 on its upper face.

Figure 2:
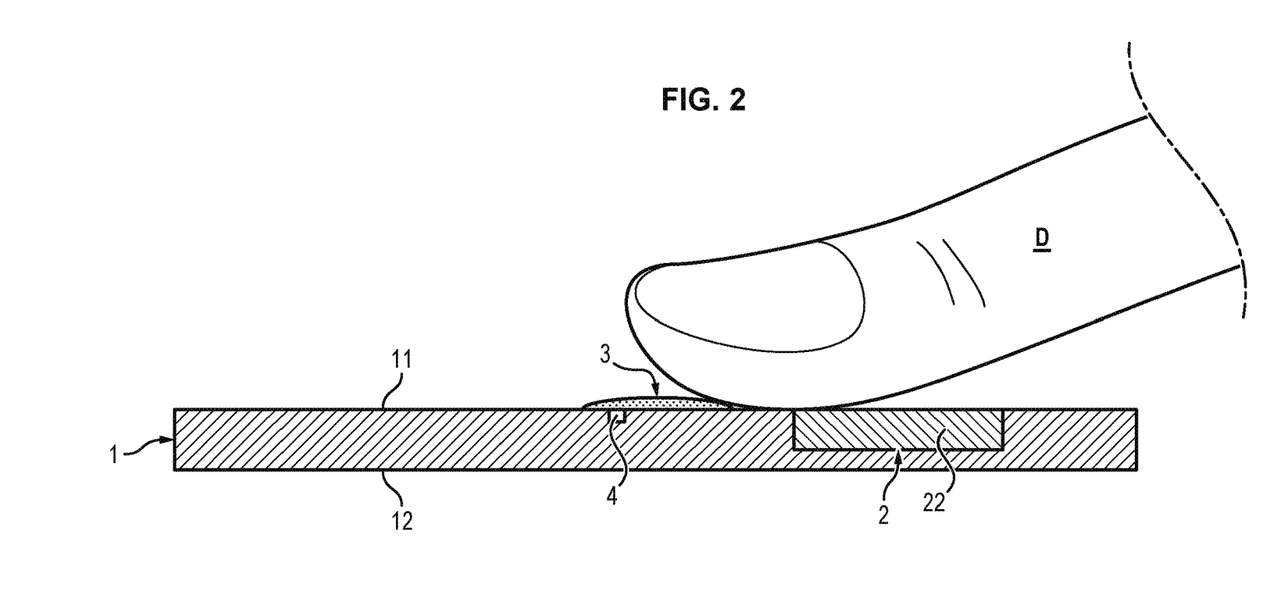
FIG. 2 illustrates a profile view of the electronic card of FIG. 1.

This mark 3 lets a user correctly position his (her) finger D on the fingerprint sensor 2 (FIG. 2).

In particular, the tactile mark 3 has excess thickness on the upper surface of the card. The thickness of the tactile mark 3 is between 30 and 60 µm, typically 50 µm.

More generally, the thickness of the tactile mark 3 is such that the card body 1 and the mark 3 combined have a thickness compatible with standard ISO 781 ID1.

In this way, the tactile mark 3 presents, to the touch, a roughness different from that of the card body and is advantageously invisible to the naked eye: the user feels a relief by means of his finger.

In addition, an alignment mark 4—visible to the naked eye—indicates the position 4 of the fingertip of the user and is typically a portion of a circle representing a fingertip.

The tactile mark 3 with optionally the alignment mark 4 are always placed near the fingerprint sensor but in different ways.

This alignment mark offers an additional aid to positioning of the finger on the fingerprint sensor.

Figure 1:
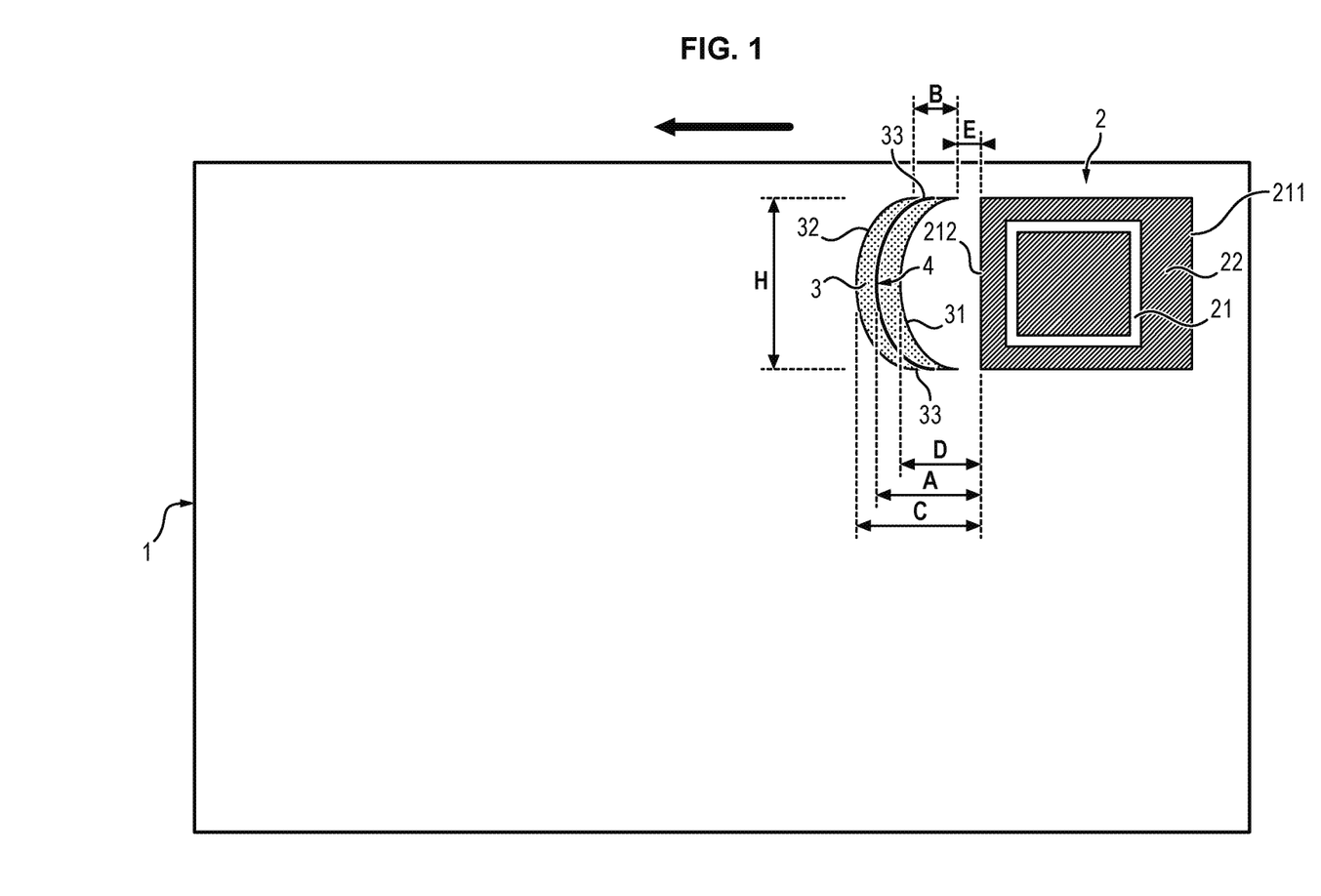
FIG. 1 illustrates a top view of an electronic card according to a first embodiment of the invention.

According to a first embodiment illustrated in FIG. 1, the tactile mark 4 is placed such that the finger is correctly positioned when the user starts to detect the presence of the tactile mark by touch.

In particular, the tactile mark 3 comprises two arcs of a circle, similar to each other: an internal arc of a circle 31 and an external arc of a circle 32.

These two arcs of a circle are connected at their ends by longitudinal line segments 33 parallel to the direction of positioning of the finger on the fingerprint sensor. The two arcs of a circle are in each other and are open to the fingerprint sensor 2.

The arcs of internal 31 and external 32 circles and the line segments 33 delimit the tactile mark form.

The height of the tactile mark 3 is similar to that of the width of the fingerprint sensor 2 (dimension H in FIG. 1). The middle of the internal arc of a circle is located between 4 and 6 mm, typically 5 mm from the edge of the fingerprint sensor (dimension D in FIG. 1). The middle of the external arc of a circle is located between 9 and 12 mm, typically 11 mm from the edge of the fingerprint sensor 1 (dimension C in FIG. 1).

The line segments connecting the ends of the arcs of a circle are at a distance between 1 and 2.5 mm, typically 2 mm from the edge of the fingerprint sensor 1 (dimension E in FIG. 1) and have a length of between 2.5 and 3.5 mm, typically 2 mm (dimension B in FIG. 1). This tactile mark 3 has a thickness increasing from the line segments to the centre of the mark but is symmetrical.

Figure 3:
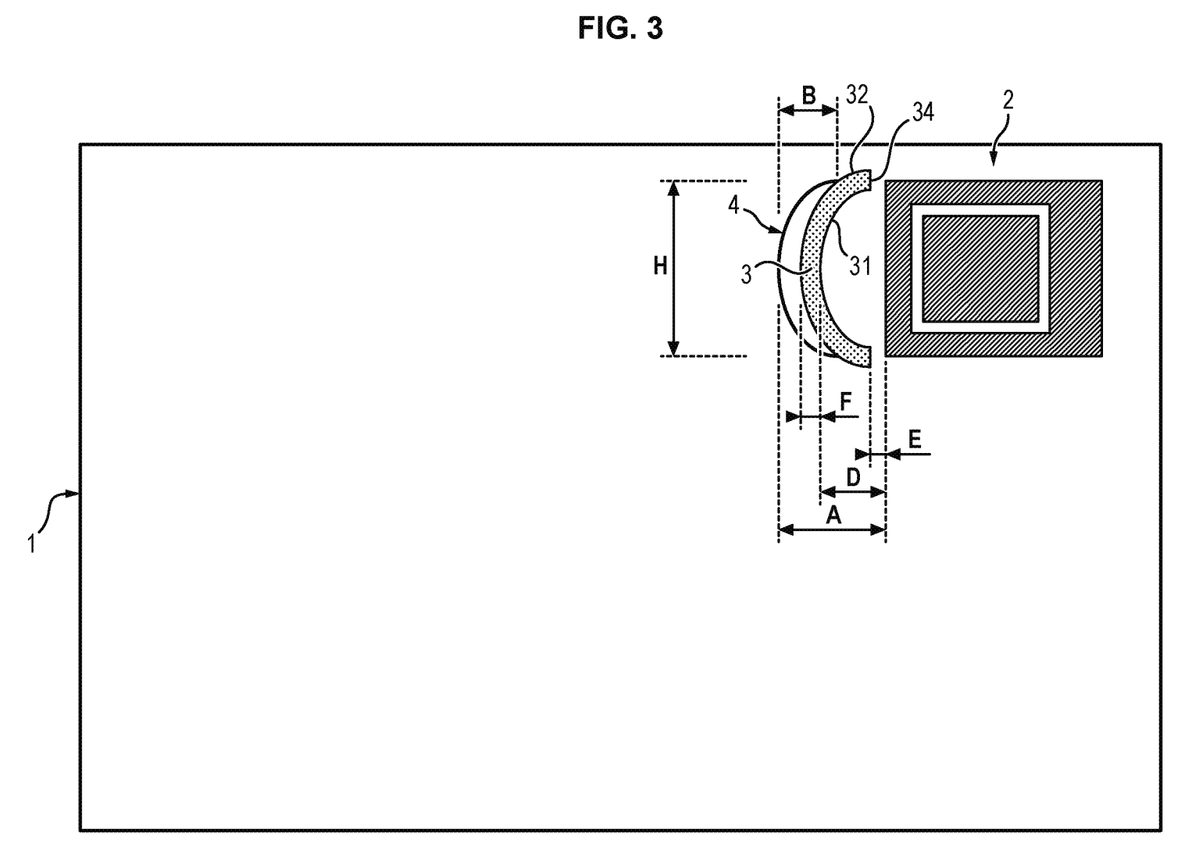
FIG. 3 illustrates a top view of an electronic card according to a second embodiment of the invention.

According to a second embodiment, illustrated in FIG. 3, the tactile mark 3 is placed such that the finger is correctly positioned when the user starts to detect the presence of the tactile mark by touch.

This tactile mark 3 comprises two arcs of a circle 31, 32 in each other connected at their ends by two line segments. The arcs of a circle and the line segments delimit the form of the tactile mark.

Figure 4:
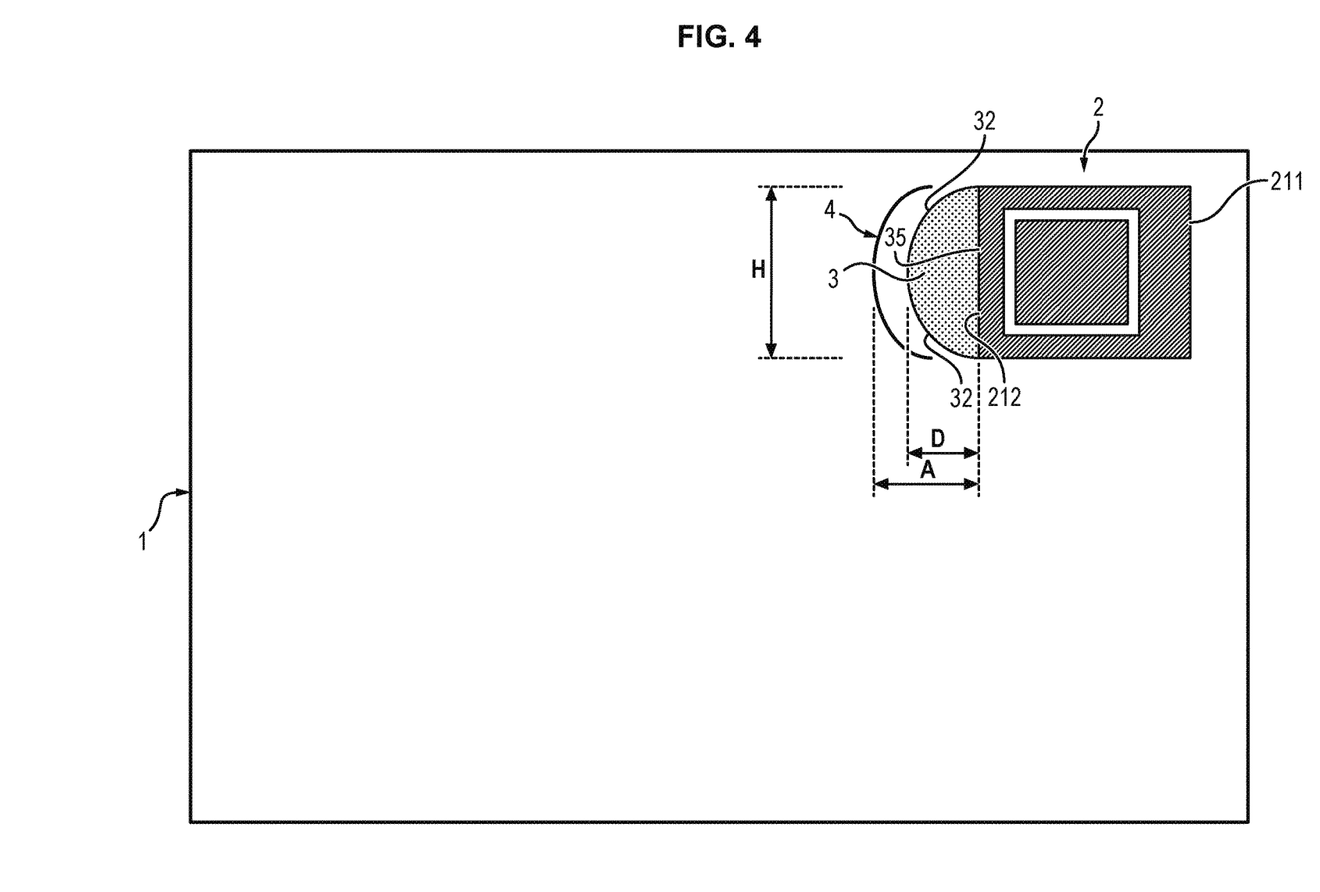
FIG. 4 illustrates a top view of an electronic card according to a third embodiment of the invention.

The arcs of a circle do not have the same dimension. The internal arc of a circle is included in the external arc of a circle. Their ends are connected by line segments 34 which extend transversally on the upper surface of the card body. The middle of the internal arc of a circle 31 is located between 4 and 6 mm, typically 5 mm from the edge of the fingerprint sensor (dimension D in FIG. 3). The line segments connecting the ends of the arcs of a circle are at a distance of between 1 and 2.5 mm, typically 2 mm from the edge of the fingerprint sensor 1 (dimension E in FIG. 3). This tactile mark 3 has a constant thickness between 1.5 and 2.5 mm, typically 2 mm (dimension F in FIG. 3). The height of the tactile mark is slightly larger than the width of the fingerprint sensor 2 (dimension H in FIG. 3). According to a third embodiment, illustrated in FIG. 4, the tactile mark 3 is placed such that the finger is correctly positioned when the user feels the end of the tactile mark, by touch.

In this figure in particular, the form of the tactile mark is defined by a semi-circle 32 closed by a line segment 35 adjoining the second edge 212 of the fingerprint sensor 2. The radius of the semi-circle formed 32 is between 4 and 6 mm, typically 5 mm from the second edge 212 of the fingerprint sensor 1 (dimension D in FIG. 4).

Figure 5:
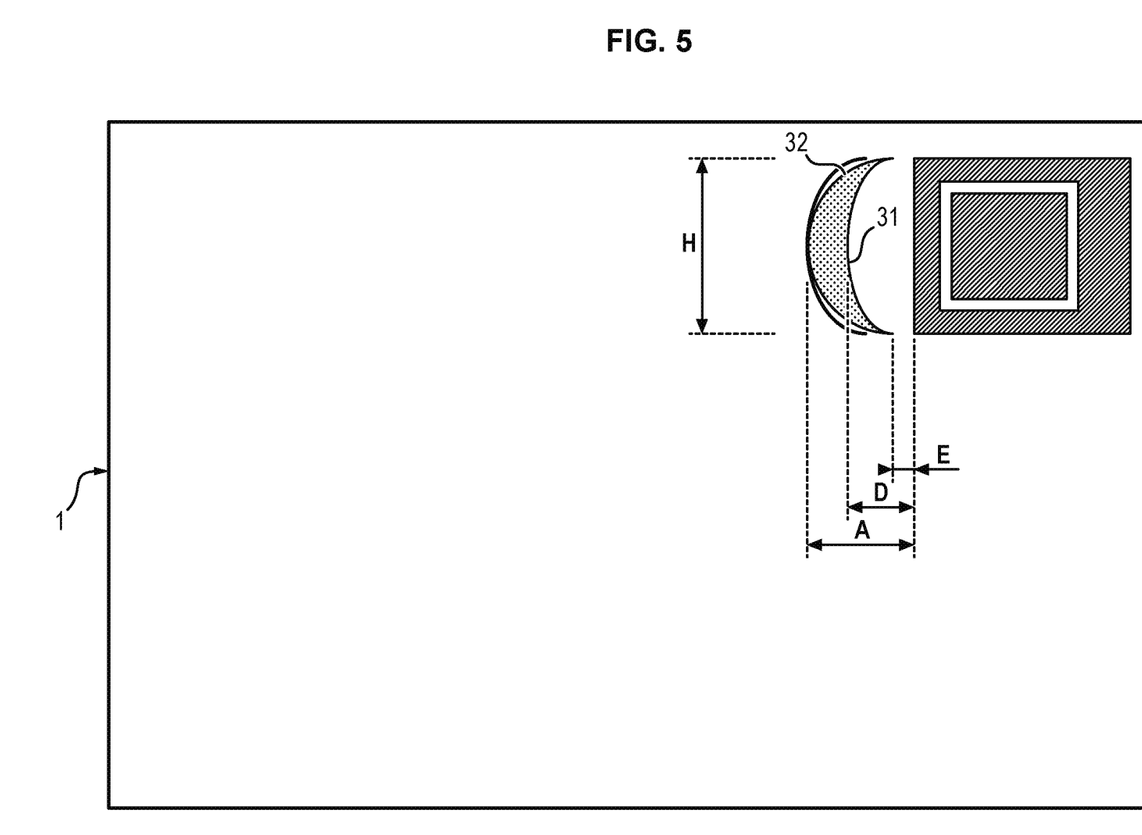
FIG. 5 illustrates a top view of an electronic card according to a fourth embodiment of the invention.

According to a fourth embodiment, illustrated in FIG. 5, the tactile mark is placed such that the finger is correctly positioned when the user starts to detect the presence of the tactile mark by touch.

In this figure, the tactile mark 3 has the form of a full crescent moon: an internal arc of a circle 31 and an external arc of a circle 32 joined at their ends. The middle of the internal arc of a circle is at a distance between 4 and 6 mm, typically 5 mm from the edge of the fingerprint sensor (dimension D in FIG. 5). The middle of the external arc of a circle is at a distance between 9 and 11 mm, typically 10 mm (dimension A in FIG. 5).

Figure 6:
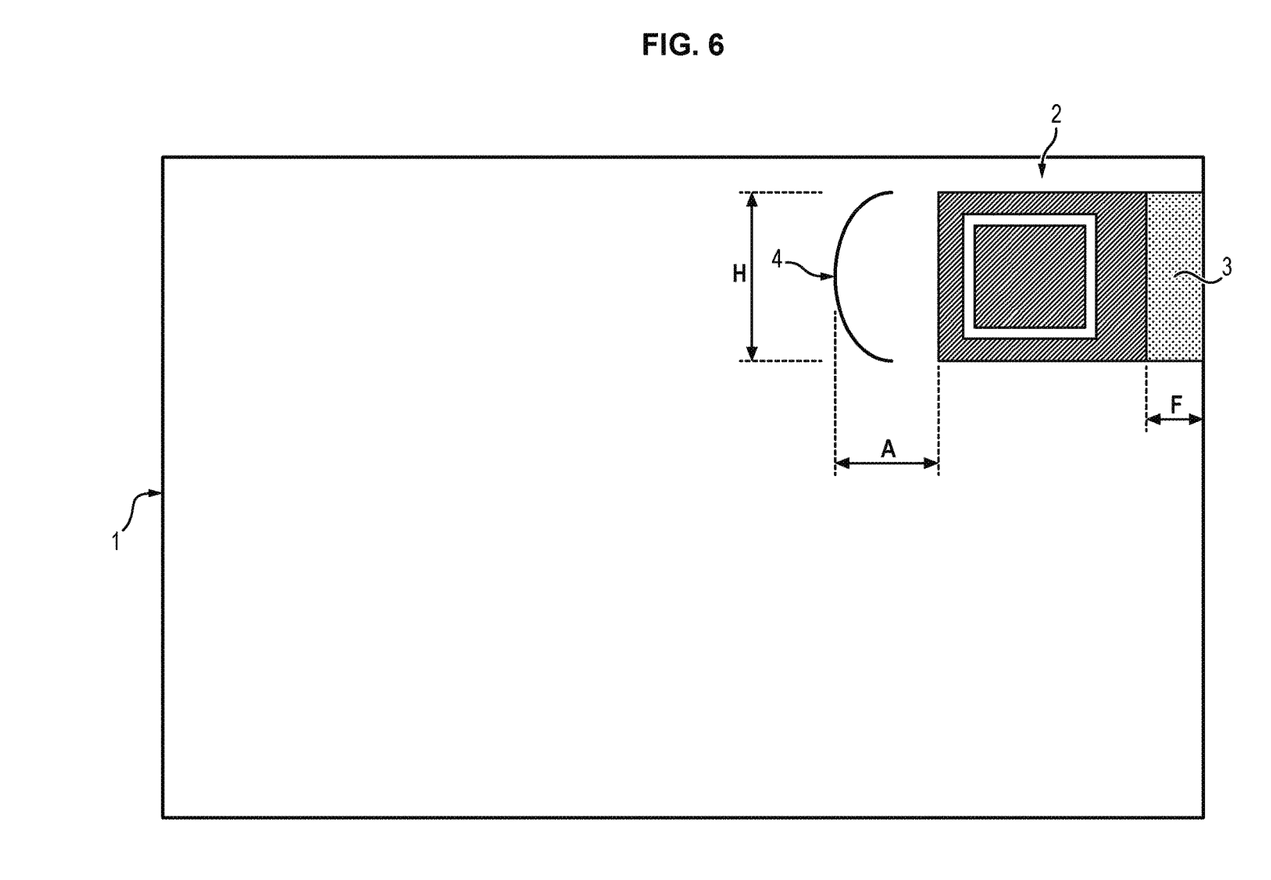
FIG. 6 illustrates a top view of an electronic card according to a fifth embodiment of the invention.

According to a fifth embodiment, illustrated in FIG. 6, the mark is placed such that the user feels the first edge of the fingerprint sensor 2 by touch so that he can place his (her) finger flat on the fingerprint sensor 2.

In this figure, the tactile mark is defined by a rectangle of length, the width of the fingerprint sensor 2 and width extending from the first edge of the fingerprint sensor as far as the edge of the card body. The width is between 2.8 mm and 3.5 mm, typically 3 mm (dimension F in FIG. 6).

Figure 7:
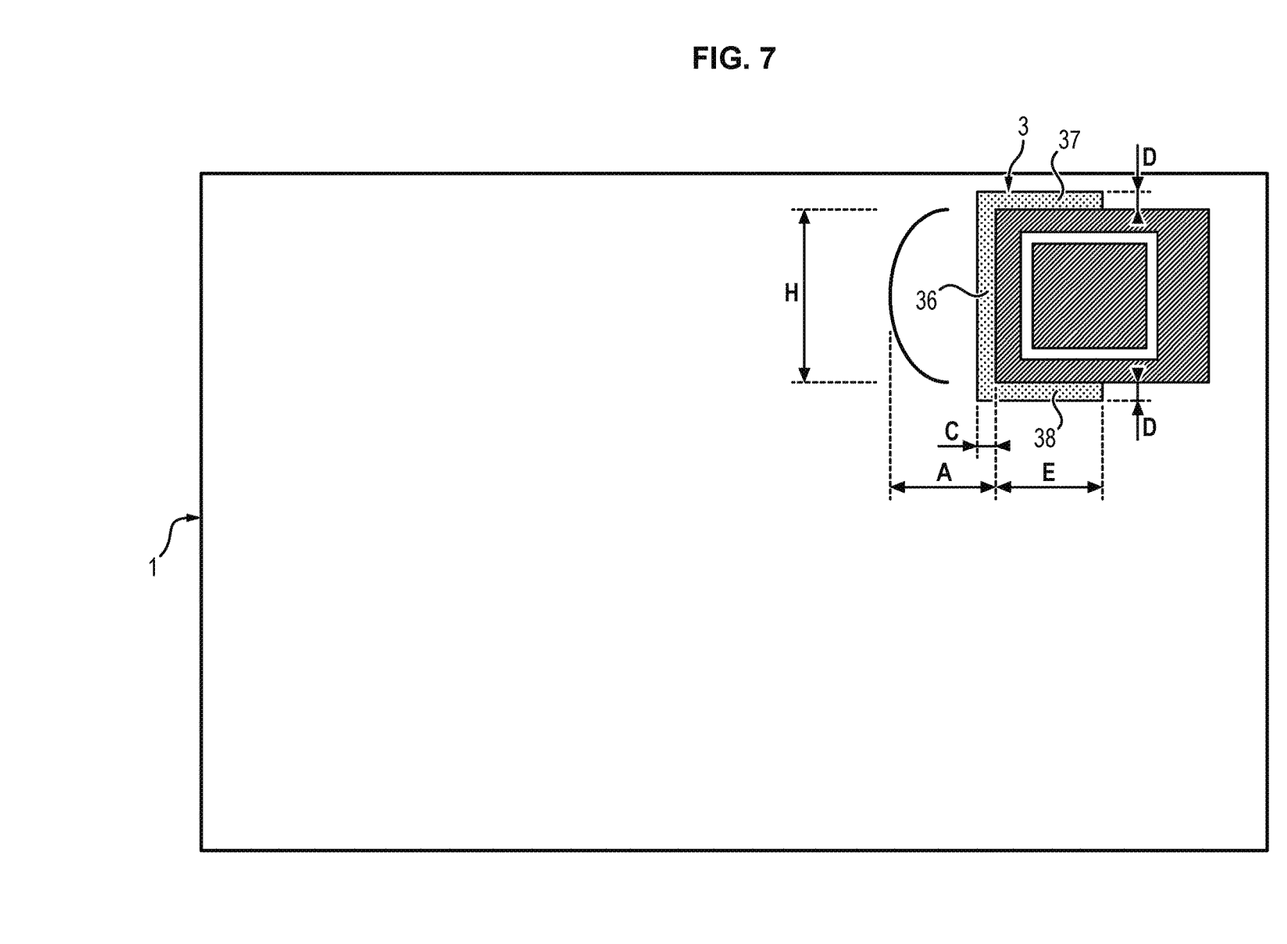
FIG. 7 illustrates a top view of an electronic card according to a sixth embodiment of the invention.

According to a sixth embodiment, illustrated in FIG. 7, the tactile mark is placed such that the user feels the second edge of the fingerprint sensor by touch.

According to this embodiment, the tactile mark is in a U-shape which encircles the fingerprint sensor. In particular, the U encircles the sensor from its second edge.

The base 36 of the U is such that it projects on either side of the width of the fingerprint sensor by 2 mm (dimensions D in FIG. 7) and has a width of 2 mm (dimensions C in FIG. 7). The branches of the U extend from the base of the U along the longitudinal edges of the fingerprint sensor over a length between 7 and 9 mm, typically 8 mm (dimension E in FIG. 7).

Figure 8:
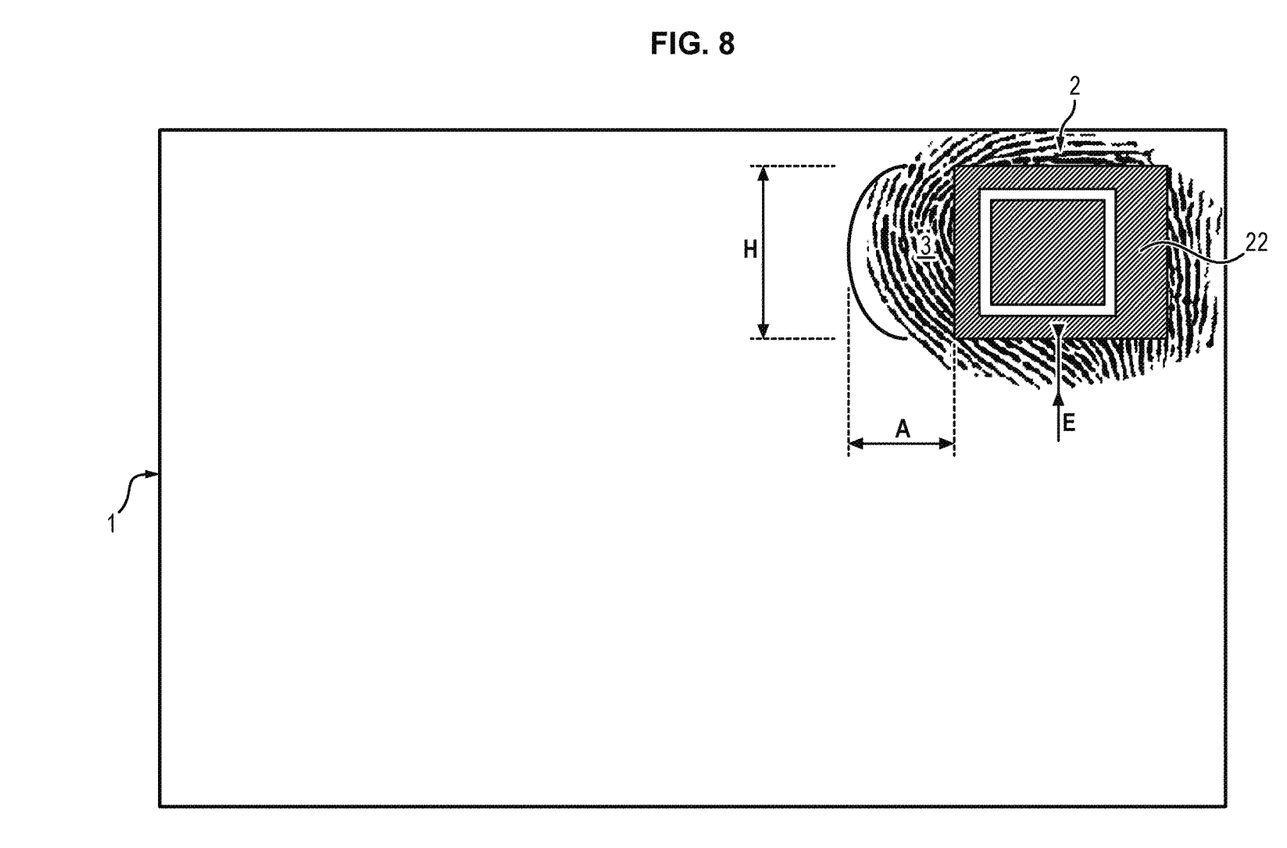
FIG. 8 illustrates a top view of an electronic card according to a seventh embodiment.

According to a seventh embodiment, illustrated in FIG. 8, the tactile mark is defined by the image of a fingerprint around the fingerprint sensor. In this way, the user will feel the mark over the entire contact surface by touch. The tactile mark 3 is such that it projects over the edges of the sensor by around 3 to 5 mm, typically 4 mm (dimension C in FIG. 8). The idea is that the sensor is included in the tactile mark to correctly position the finger over the entire contact surface between the card and the finger of the user. This is not a simple case of indicating the position of the sensor but indicating the complete position of the finger on the sensor.

In addition, for each tactile mark of the embodiments described hereinabove, an alignment mark 4 in the form of an arc of a circle is drawn on the upper surface of the card body 1. The alignment mark is such that the middle of the arc of a circle is at a distance between 9 and 11 mm, typically 10 mm from the second edge 212 of the fingerprint sensor 2 (dimension A in the figures).

The tactile mark can be added in different ways.

As is known per se, a card body of an electronic card described hereinabove is obtained by hot lamination of several layers, the most of them made of plastic. The upper plastic surface is often a layer of transparent protection of another plastic layer which supports various inscriptions (client artwork, various decorations, identity, etc.).

The lamination parameters depend on the materials used but can vary from temperatures below 100° C. for a few seconds to temperatures over 180° C. for 20 minutes at different pressures. The aim of the operation is to produce a homogeneous structure with adhesion of the different layers together complying with standard ISO7810.

According to a first embodiment, the tactile mark is added during lamination of layers together. In particular, the tactile mark is generated by using previously etched lamination plates.

According to a second embodiment, the tactile mark is added after lamination of the layers together. In particular, the layers laminated together are printed by means of tactile varnish via screen printing to create adequate thickness to achieve a feel while retaining a thickness complying with standard ISO 781 ID1. The varnish is added to the upper face of the card body. Such varnish is for example a relief varnish added with a certain coating by way of a thick-wick screen to achieve such a thickness that the tactile mark is no more than 50 μm. After the varnish is added, a curing step is performed and the tactile mark appears in relief on the upper face of the card body.

Curing is a thermal one or based on UV as a function of the selected varnish.

According to a third embodiment, the tactile mark is also added after the obtention of the card body. In particular, an etching step of the upper face of the card body is conducted by means of a laser. This step consists of burning the upper face of the card body according to the pattern of the tactile mark to obtain the mark in relief. It is clear that this embodiment can generate dark marks and will be used for cards with dark artwork.

The invention claimed is:
1. An electronic card comprising
    a card body (1) comprising an upper surface (11) and a lower surface (12);
    a fingerprint sensor (2) flush with the upper surface of said card body, the fingerprint sensor (2) being configured to acquire an image of a fingerprint of a user when a finger of the user is placed on an active part (21) of the fingerprint sensor (2);
    a tactile mark (3) placed on the upper surface of the card body near the fingerprint sensor, said tactile mark having an excess thickness from the upper surface of the card to guide, when said mark is touched, a correct positioning of a finger on the active part (21) of said fingerprint sensor, the thickness of the tactile mark being such that the card has a thickness compatible with standard ISO 781 ID1, the thickness of the tactile mark preferably being between 30 and 60 μm, typically 50 μm.

2. The electronic card according to claim 1, wherein the tactile mark is defined by two arcs of a circle in each other jointed at their ends by line segments.

3. The electronic card according to claim 1, wherein the tactile mark is in the form of a crescent moon.

4. The electronic card according to claim 1, wherein the tactile mark is defined by a semi-circle adjoining the fingerprint sensor.

5. The electronic card according to claim 1, wherein the tactile mark is defined by a U encompassing the fingerprint sensor.

6. The electronic card according to claim 1, wherein the tactile mark is defined by the image of a fingerprint placed around the fingerprint sensor (2).

7. The electronic card according to claim 1, also comprising an alignment mark visible to the naked eye defining a position of the fingertip of the user on the upper surface of the card body, the alignment mark being typically an arc of a circle open to the fingerprint sensor.

8. The electronic card according to claim 1, wherein the card body having been obtained by lamination of several layers together, the tactile mark being obtained by printing of a varnish on the upper surface of the card body, by means of a screen printing process followed by a curing step of the card body and of the tactile mark.

9. The electronic card according to claim 1, wherein once the card body having been obtained by lamination of several layers together, the tactile mark being added by etching, by means of a laser, of the upper surface of the card body.

10. The electronic card according to claim 1, wherein the tactile mark is obtained simultaneously with the card body by lamination of several layers together, lamination plates being etched with the pattern defining the tactile mark.

* * * * *